Oct. 10, 1939.   R. W. SHOEMAKER   2,175,575
COMPOSITE PIPE CONNECTOR AND METHOD OF PRODUCING SAME
Filed May 16, 1938   4 Sheets-Sheet 1
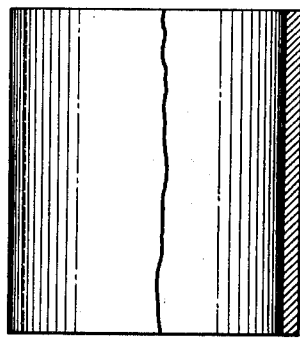
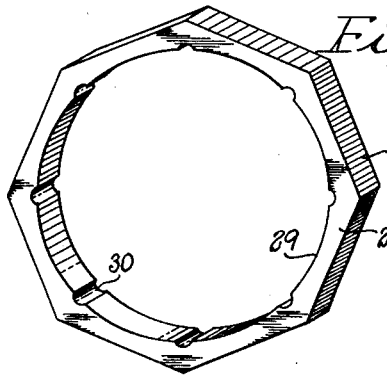
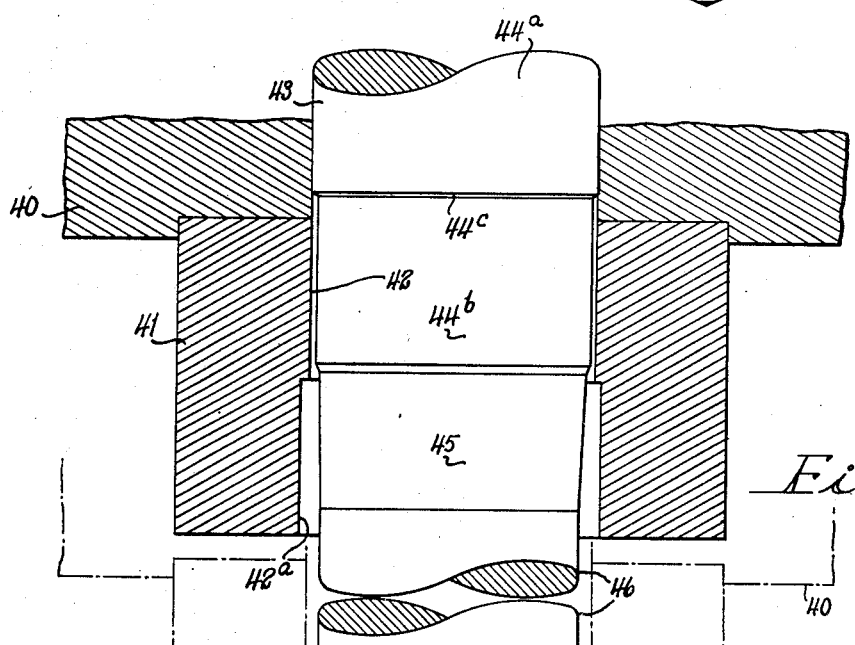
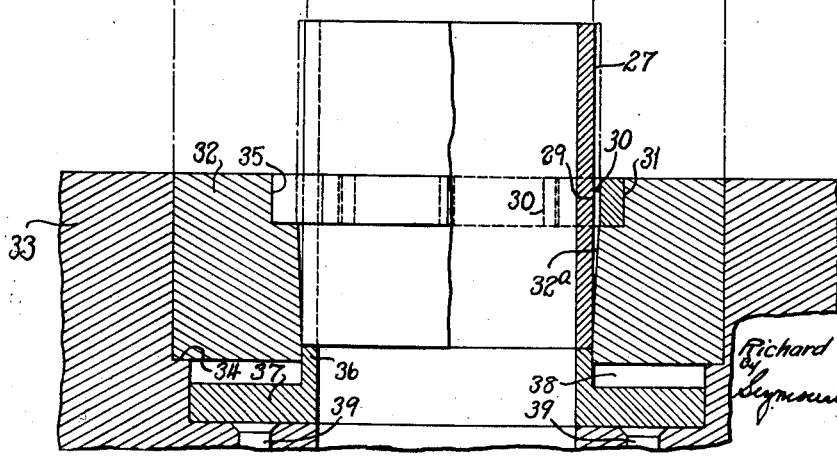
Inventor
Richard W. Shoemaker
by Seymour Earle Nichols
Attorneys Oct. 10, 1939.   R. W. SHOEMAKER   2,175,575
COMPOSITE PIPE CONNECTOR AND METHOD OF PRODUCING SAME
Filed May 16, 1938   4 Sheets-Sheet 3
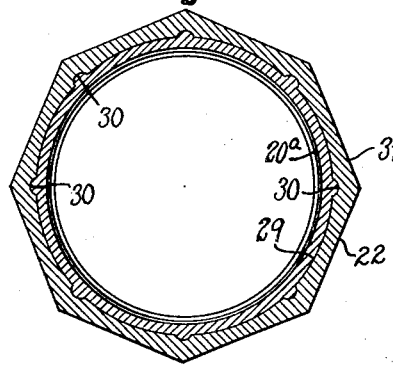
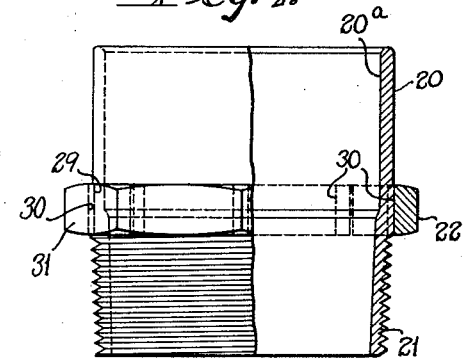
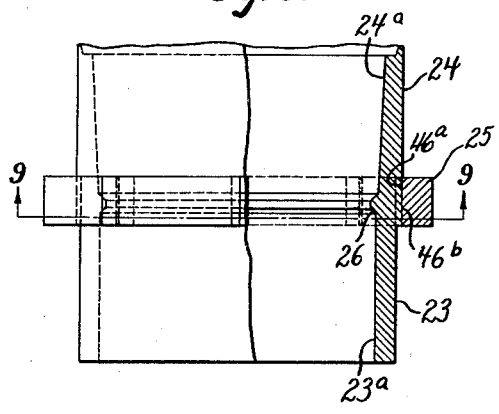
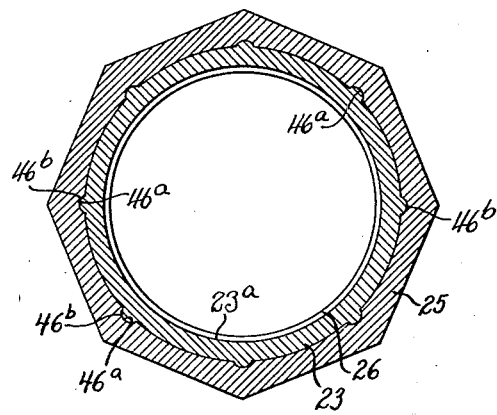
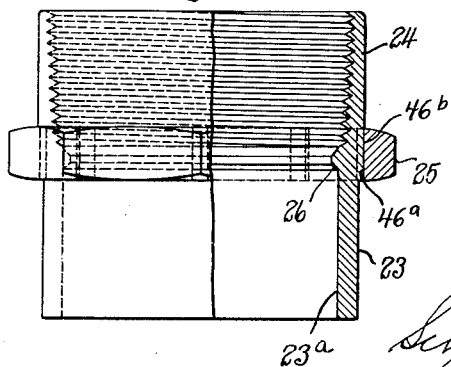
Inventor
Richard W. Shoemaker
by Seymour Earle & Nichols
Attorneys Patented Oct. 10, 1939

2,175,575

UNITED STATES PATENT OFFICE 2,175,575

COMPOSITE PIPE CONNECTOR AND METHOD OF PRODUCING SAME

Richard W. Shoemaker, Woodbury, Conn., assignor to Chase Brass & Copper Co., Incorporated, Waterbury, Conn., a corporation Application May 16, 1938, Serial No. 208,097

10 Claims. (Cl. 29—157)

This invention relates to an improved construction for and an improved method of producing pipe-connectors having wrench-receiving portions whereby pipe-connectors such, for example, as adapters, parts of unions, couplings, etc., provided with threaded portions, may be assembled with other pipe-connectors, pipes, tubes, and the like, by means of interthreaded portions of the said connectors.

One object of this invention is to provide an improved construction for and an improved method of constructing a pipe-connector comprising a threaded tubular portion integrated with a separately-constructed preformed wrench-receiving portion, by means of a non-rotational interlocking joint formed therebetween during a working operation performed on a tubular blank to form the threaded tubular portion after the said preformed wrench-receiving portion has been positioned thereon.

Another object of the present invention is to provide an improved construction for and an improved method of producing pipe-fittings comprising separately-constructed parts formed respectively of different materials whereby each of the said parts of the pipe-fittings is better qualified to meet service requirements of a peculiar nature imposed thereon.

Still another object of this invention is to provide a pipe-fitting or -connector of the character referred to and an improved method for producing such pipe-fittings or -connectors whereby a separately-constructed wrench-receiving member or portion preformed of relatively-hard resistant material, may be subsequently applied to and integrated with the body or fluid-conducting member or portion of the said pipe-fitting during a forging or cold-working operation performed on a relatively-soft metal blank from which said body- or run-portion of the pipe-fitting is formed.

The present invention has for an object, more especially, to provide an improved construction for and an improved method of producing a pipe-fitting of the adapter type comprising a wrought-metal tubular body- or run-portion formed of non-ferrous metal such, for example, as copper or copper alloy predominantly copper; and a relatively-hard resistant wrench-receiving member or portion, preferably having a polygonal perimeter, to facilitate the production of pipe-fittings of this type and to better qualify the several parts to serve their respective functions of a widely different nature.

A further particular object of the invention is to provide an improved construction for and an improved method of constructing a threaded pipe-connector comprising a tubular fluid-conveying member of relatively-corrosion-resistant metal such, for example, as copper or a copper alloy; and a separately-constructed preformed wrench-receiving member constructed of relatively-hard resistant metal to be non-rotationally interlocked with the fluid-conveying member and, in this way, to utilize the desirable qualities of the softer metals for the tubular fluid-conveying member while retaining the advantageous features of hard resistant metals in the wrench-receiving member which is exposed to mechanical wear and tear.

With the above and other objects in view, as will appear to those skilled in the art, from the present disclosure, this invention includes all features in said disclosure which are novel over the prior art.

In the accompanying drawings which illustrate the present invention, in connection with the production of several forms of pipe-connectors, Fig. 1 is a view partly in side elevation and partly in axial section of a tubular blank suitable for carrying out the present invention;

Fig. 2 is a perspective view of the preformed wrench-receiving member prior to its connection with the tubular fluid-conveying member of the pipe-connector;

Fig. 3 is an axial section of a punch-and-die mechanism suitable for reducing the invention to practice;

Fig. 6 is a transverse section on the line 6—6 of Fig. 5;

Fig. 7 is a view partly in side elevation and partly in axial section of the finished pipe-connector which, in the present instance, is shown in the form of a male threaded adapter;

Fig. 8 is a similar view of an unfinished female adapter at the end of the cold-forging operation;

Fig. 9 is a transverse section on the line 9—9 of Fig. 8;

Fig. 10 is a view partly in side elevation and partly in axial section of the finished threaded female adapter shown partly finished in Fig. 8;

Figure 4:
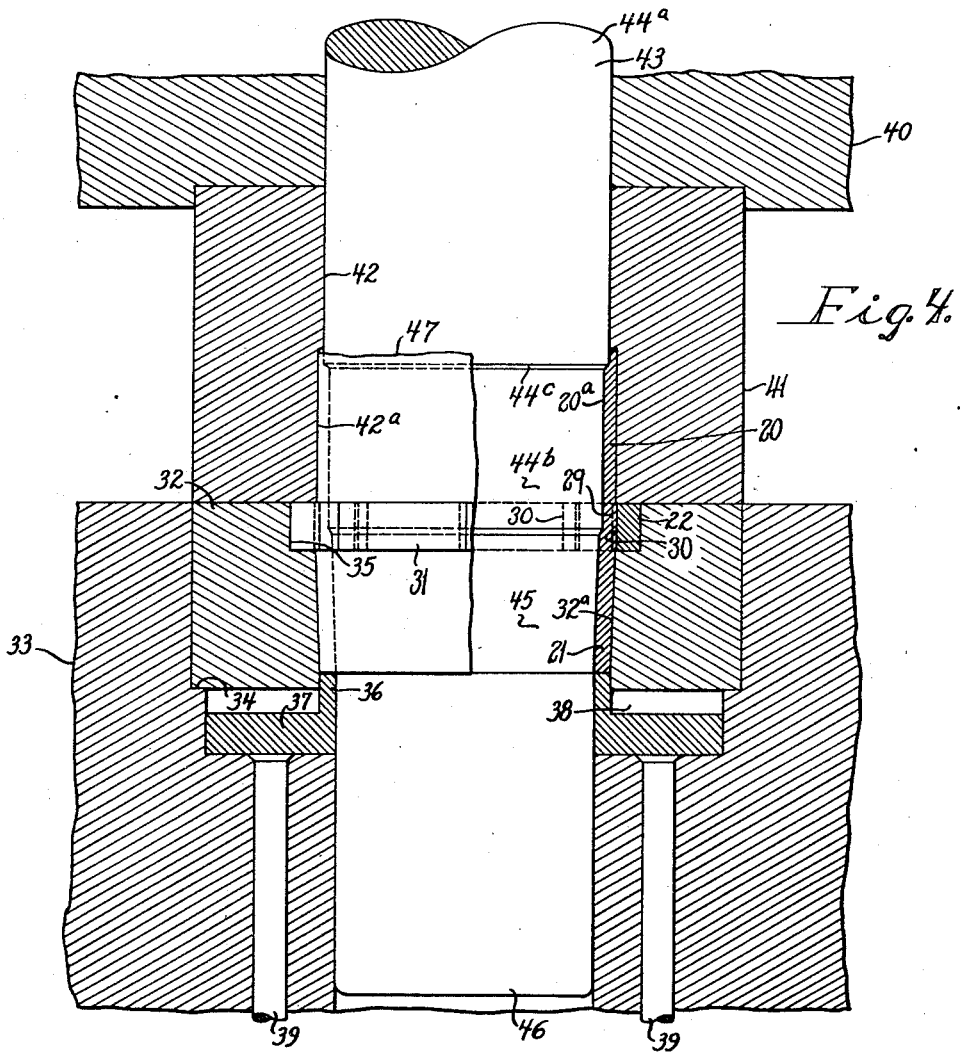
Fig. 4 is a similar view of the punch-and-die mechanism shown in Fig. 3 with the operating parts shown in their relative positions at the end of the cold-forging operation.
Figure 11:
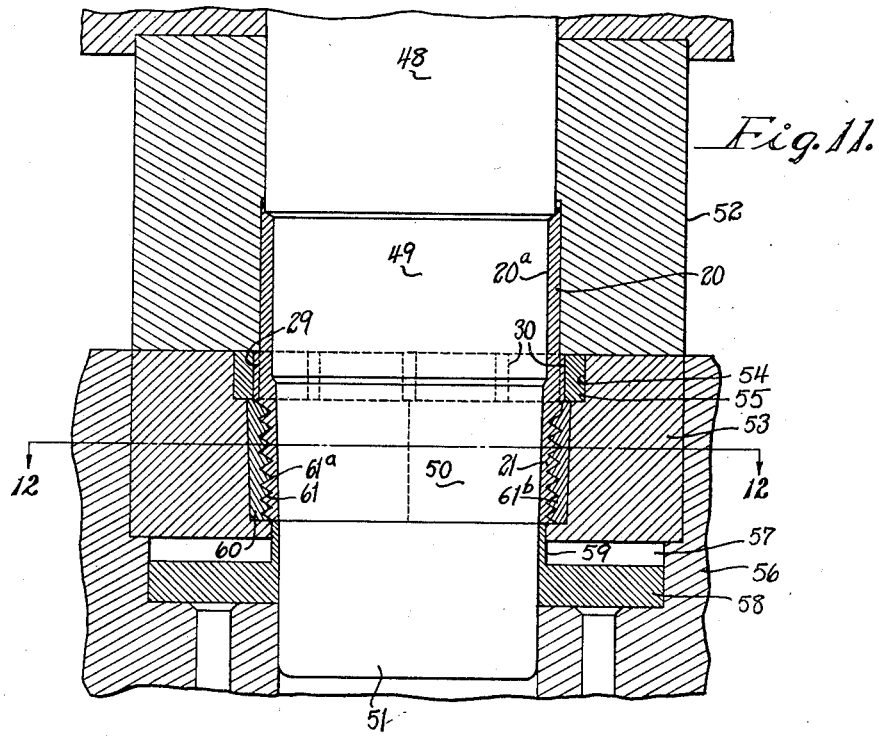
Figure 12:
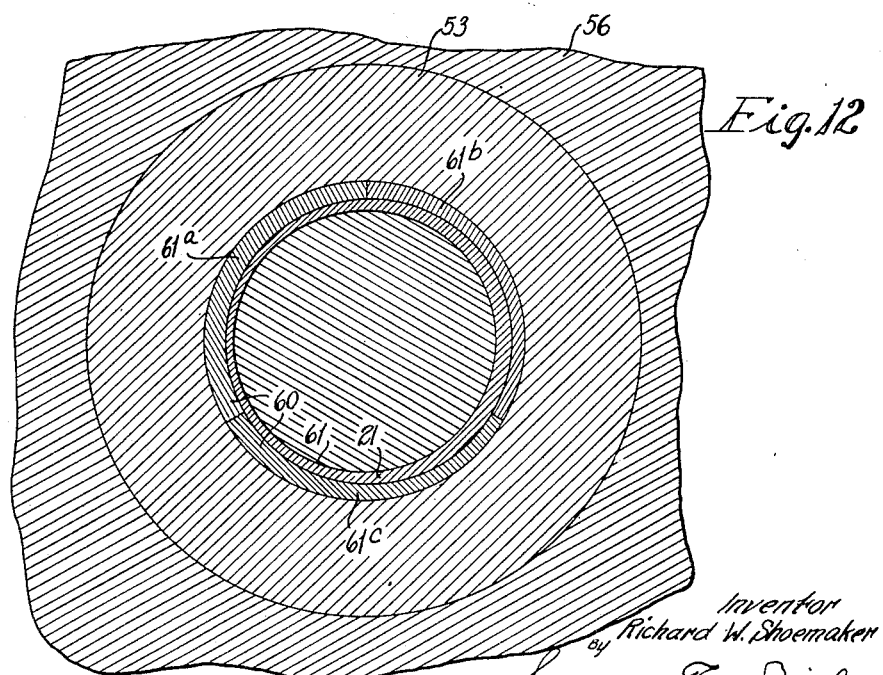

Fig. 11 is an axial section of a modified form of the punch-and-die mechanism shown in Figs. 3 and 4 wherein a male adapter of the type shown in Fig. 7, may have one of its terminal portions provided with screw-threads by means of the cold-forging operation, the operating parts of the punch-and-die mechanism being shown in their relative positions at the end of the cold-forging operation; and Fig. 12 is a transverse section on the line 12—12 of Fig. 11.

The accompanying drawings illustrate the invention in adaptations to pipe-connectors in the form of adapters in which the fluid-conveying tubular portion of the pipe-connector is constructed of one kind of material such, for example, as relatively-soft copper or copper alloy predominantly composed of copper, whereas the wrench-receiving portion or member thereof, is constructed of some other material which is hard and resistant such, for example, as relatively-hard copper alloys or the like, and preformed prior to its integration with the said fluid-conveying portion or member. In this way, a pipe-connector may be constructed to comprise component portions or members formed from different material or metals having markedly different physical properties whereby the respective portions of the said pipe-connector are rendered more effective and serviceable for discharging the functions respectively assigned to said portions of the pipe-connector.

For the purposes of illustration, the invention is shown in its adaptation to a pipe-connector used in connection with a water-conveying or other fluid-conducting system wherein, for the purpose of rendering the tubular fluid-conveying portion or run-portion of a pipe-connector resistant to corrosion, it is desirable to construct said run-portion of non-ferrous metal such, for example, as copper or copper alloy predominantly copper.

In certain types of pipe-connectors which are to be joined by one or more threaded connections, for example, to other pipe-connectors, pipes, etc., it is customary to provide the pipe-connector with a wrench-receiving member for the purpose of imparting a rotational movement to one of the connected parts, which is most frequently a fluid-conveying portion of the pipe-connector.

According to the illustrative forms of the invention shown on the drawings, the pipe-connector is in the form of an adapter designed to interconnect an unthreaded tube or fitting to a threaded tube or fitting and comprises a composite structure which includes a fluid-conveying or run-portion constructed of cold-drawn copper tubing of suitable size, length and wall-thickness and which is expanded to predetermined size and shape within a separately-constructed preformed wrench-receiving portion or member constructed of suitable hard and resistant metal, the wrench-receiving member being substantially of annular form and provided around its inner periphery with suitable recesses into which portions of the metal composing the fluid-conveying portion of the pipe-connector are forcibly intruded as, for example, by a cold-forging operation to positively interlock the portions or members against relative rotational movement when a wrench is applied to the wrench-receiving member.

In Fig. 7 is shown a threaded male adapter exemplifying the improved construction and improved method of production contemplated by the present invention. In the form shown in the drawings, the threaded male adapter comprises a terminal end-portion 20 provided with a smooth inner cylindrical surface 20a to be telescopically fitted to the outer wall of another pipe, pipe-fitting or the like to which it may be joined by a sweat-soldered operation; an exteriorly-threaded terminal portion 21 of generally-tapered form to adapt it to be screwed into the threaded socket of another pipe-fitting, pipe or the like; and an intermediate pipe wrench-receiving portion or member 22 preferably polygonal in form whereby the adapter may be screwed into a threaded socket by means of a wrench applied thereto.

In Fig. 10, is shown a threaded female adapter having a tubular body- or run-portion comprising a cylindrical terminal 23 provided with an inner smooth surface 23a for another pipe, pipe-fitting or the like to be telescopically fitted thereinto and connected therewith by a sweat-soldered operation or the like; an interiorly-threaded terminal-portion 24 which has a generally-tapered form to be threaded onto another threaded end of another pipe-fitting, pipe or the like; and a wrench-receiving member or portion 25 mounted on the outer wall of the body- or run-portion of the pipe-fitting intermediate the oppositely-presented terminals thereof. Interiorly, the body- or run-portion of the pipe fitting is provided with an annular shoulder or projection 26 which is disposed approximately in the central transverse plane of the wrench-receiving member 25 for limiting the endwise insertion of an unthreaded pipe or pipe-fitting within the terminal-portion 23.

In Fig. 1 is shown a short section 27 of solid-drawn copper pipe or tube of suitable size, shape and wall-thickness to serve as a blank from which the body- or run-portion of the pipe-fitting shown in Fig. 7 may be constructed according to the hereinafter described improved method of the present invention. For this purpose, the tubular blank 27 may be subjected to a cold-forging operation in a punch-and-die mechanism presently to be described.

In Fig. 2 is shown a detached pre-formed wrench-receiving member 22 which is provided with an inner periphery 29 of suitable size and shape to fit over the exterior surface of the tubular blank 27, the outer perimeter of the wrench-receiving member being provided with polygonal facets 31 to be engaged by the jaws of a wrench. Formed in the inner periphery 29 of the wrench-receiving member 22 are a plurality of preferably part-circular recesses 30 which are spaced peripherally around and depressed with respect to the surface 29 for a purpose to be hereinafter explained.

Figs. 3 and 4 show one form of punch-and-die mechanism suitable for applying the improved method of producing pipe-fittings of the character shown and described herein. In Fig. 3 is shown the relative arrangement and set-up of the tubular blank 27 and wrench-receiving member 22 within a die-block 32, the said die-block 32 being mounted within a bed-plate 33 wherein it is supported around its peripheral edge by means of an annular shoulder or ledge 34 formed in the bed-plate 33. As shown in Fig. 3, the die-block 32 is provided with a polygonal recess 35 which conforms to the outer perimeter 31 of the wrench-receiving member 22, the said recess 35 being slightly larger than the perimeter 31 of the member 22 but not sufficiently large to permit an undue stretching of the metal in the wrench-receiving member 22 beyond its elastic limit. The wrench-receiving member 22 having been placed within the recess 35 as shown in Fig. 3, the tubular blank 27 is inserted therethrough with its lower end in abutment with an annular flange 36 which projects upwardly into the bore of the die-block 32 from the circular base plate 37 of a knock-out device whereby the unfinished pipe-fitting may be disengaged from the die-block 32 at the end of the forging operation. For this purpose, the knock-out 37 is mounted in a circular recess 38 formed in the bed-plate 33 which is disposed immediately above a plurality of vertically-movable rods 39 which are constructed and arranged to impart a vertical upward displacement of the knock-out 37 under the action of any suitable mechanism (not shown) operating at the lower ends of rods 39.

Mounted above the die-block 33 is a reciprocatory cross-head 40 from which depends a sleeve die 41 arranged to be moved downardly into rigid engagement with the die-block 32 at the beginning of the cold-forging operation which expands the tubular blank 27 into interlocking engagement with the wrench-receiving member 22 of the pipe-fitting assembly. Extending vertically through the die-sleeve 41 and arranged to cooperate with successive cylindrical walls 42 and 42a of the sleeve-die 41, is a forming-die plunger 43 comprising a main body-portion 44a; a cylindrical sizing-and-forming portion 44b; a downwardly-tapered sizing-and-forming portion 45; and a pilot end-portion 46.

It will be understood from the foregoing description that during the downward movement of the plunger 43 and sleeve-die 41, the latter is intercepted at its lower end by the die-block 32 while the downward movement of the pilot 46 through the tubular blank 27, is followed by a gradual diametrical expansion of the tubular blank 27 produced by the tapered sizing-and-forming portion 45 of the plunger-die as it moves downwardly therethrough. At the same time, the tubular blank 27 is subjected to endwise compression and resultant shortening, by being compressed between a shoulder 44c on the plunger 43 and the upper face of the annular flange 36 of the knock-out 37.

At the bottom of its downward movement, the plunger-die occupies the position shown in Fig. 4, in which position, the lower end of the tapered forming-die portion 45 of the plunger is disposed at the lower end of the tubular blank 27 to impart a downwardly-tapered shape to the lower terminal portion 21 of the pipe-fitting as shown in Fig. 4, while the upper cylindrical forming-die portion 44b of the plunger has been moved into the upper end of the tubular blank 27 and expanded it to form an enlarged cylindrical wall of the form shown in Fig. 4. During this cold-forging operation, an intermediate portion of the tubular blank 27 disposed within the wrench-receiving member 22, is expanded into tight frictional contact with the inner surface 29 of the wrench-receiving member 22 with the outer wall of terminal-portion 21 of the pipe-fitting conforming to the surface 32a of the die-block. At the same time, a cold flowage of the metal is produced in that portion of the tubular-blank 27 disposed within the wrench-receiving member 22 to produce part-circular protuberances which are disposed within and interlocked with the part-circular recesses 30 formed in the inner cylindrical surface 29 of the wrench-receiving member 22.

Figure 5:
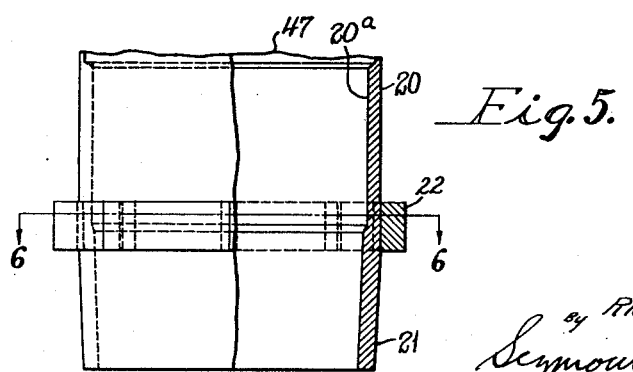
Fig. 5 is a view partly in side elevation and partly in axial section of the unfinished pipe-connector after it has been taken from the punch-and-die mechanism.

Following successive upward displacements of the punch or plunger and die-sleeve 41, the knock-out actuating-rods 39 are moved upwardly by any suitable means (not shown) to disengage the partially-finished pipe-fitting from the upwardly-divergent walls 32a of the die-block 32 by means of the annular flange 36 which engages the lower end of the shaped pipe-fitting for this purpose. The partially-completed pipe-fitting of the form shown in Fig. 5 is then readily removed from the forming-die and finished to its final form shown in Fig. 7 by removing a fin 47 of metal from the upper annular edge of the cylindrical portion 20 of the shaped pipe-fitting, and finishing-off the rough edges after which screw-threads may be machined in the outer wall of the lower portion 21 or, if preferred, the said screw-threads may be formed by a cold-working of the metal during the cold-forging or die-working operation in the manner hereinafter described.

Referring now to Figs. 8, 9 and 10 which illustrate an adaptation of the present invention to the production of a threaded female pipe-fitting of the adapter type, a cold-forging operation similar to that described above in connection with the production of a threaded male adapter pipe-fitting, may be performed on a solid-drawn tubular-blank similar to that shown in Fig. 1 to provide an unfinished adapter of the form shown in Fig. 8. For this purpose, as will be understood from the foregoing description of the embodiment of the invention shown in Figs. 1 to 7 inclusive the wrench-receiving member 25 of the embodiment shown in Figs. 8, 9 and 10, is preformed with circularly-spaced recesses 46a after which the said wrench-receiving member 25 is mounted in a holding recess in a die-block similar to that shown at 32 in Fig. 3.

A tubular blank is then positioned within the wrench-receiving portion or member 25 after which the tubular blank is subjected to a cold-forging operation by the punch-and-die mechanism to expand the said tubular blank to predetermined size and form with its outer wall in tight frictional engagement with the inner periphery of the wrench-receiving member, portions of the metal composing the said tubular blank being extruded therefrom into the recesses in the periphery of the said wrench-receiving member to interlock the said blank and member against relative rotational movement. The unfinished pipe connection thus produced, may then be finished off in the manner explained above in connection with the embodiments shown in Figs. 1 to 7 inclusive, after which the terminal portion 24 thereof may be provided with internal screw-threads either by a machining operation in the usual manner or by means of a punch-and-die operation which forms said screw-threads by a cold-forging operation.

Figs. 11 and 12 show a punch-and-die mechanism of suitable construction to produce a threaded male connector of the adapter type having intaglio threads formed thereon by means of a cold-forging operation. For this purpose, a plunger or punch may be constructed to comprise a body-portion 48; a cylindrical sizing-and-shaping portion 49; a tapered sizing-and-shaping portion 50; and a pilot end-portion 51. Surrounding the said plunger or punch, is a sleeve-die or member 52 which, in its position shown in Fig. 11, is in abutment at its lower end with the upper surface of an annular die-block 53, said die-block being provided with a polygonal recess 54 to receive a preformed wrench-receiving member 55. The said annular die-block 53 is suitably mounted in a bed-plate 56. Within a cylindrical space 57 at the bottom of the bed-plate 56, an annular base-plate 58 of a knock-out device is movable vertically to a limited extent. An annular flange 59 which is integrally formed with the annular base-plate 58 of the knock-out device, is in supporting engagement with the lower end of a tubular blank positioned within the wrench-receiving portion or member 55, prior to and during the continuance of the cold-forging operation performed thereon by the punch-and-die mechanism. Extending around the inner wall of the annular die-block 53, is a threaded ring-die 60 which is provided with an outer wall having an upward slightly divergent taper to conform to the similarly-tapered inner wall of the said annular die-block 53 and with an internally-threaded matrix 61 generally tapered downwardly to conform to the taper of a threaded male terminal of an adapter to be formed therein. It will be understood from the foregoing description that a tubular blank of the character shown in Fig. 1 having an external diameter not greater than the minimum or bottom inside diameter of the threaded matrix 61, may be placed within the wrench-receiving member 55 with its lower end resting upon the flange 59 of the knock-out device. It will be understood, furthermore, that a subsequent downward movement of the plunger comprising parts 48, 49, 50 and 51, to its lowermost position shown in Fig. 11, will effect a cold-forging operation on the assembled parts to produce an unfinished threaded male adapter of the type shown in Fig. 7, which, upon its removal from the punch-and-die mechanism, may be finished into the form of the adapter shown in Fig. 7.

For the purpose of permitting the facile removal of the unfinished threaded male adapter from the punch-and-die mechanism at the conclusion of the cold-forging operation, while at the same time permitting the threaded matrix 61 to fall away or be readily removed from the threaded terminal of the male adapter, the said threaded matrix 61 is constructed in arcuate sections 61a, 61b and 61c, as indicated in Fig. 12, so that when an upward movement is imparted to the knock-out device, the flange 59 will effect a corresponding upward movement to the adapter as well as the sectional threaded matrix 61 from the die-block 53 to release the matrix sections from the die-block and from engagement with the threaded terminal of the male adapter.

The invention may be carried out in other specific ways than those herein set forth, without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A pipe connector, comprising in combination: a preformed wrench-receiving member constructed to surround and be mounted upon a tubular member; and a tubular fluid-conducting member rigidly interlocked with the wrench-receiving member against relative movement; the said tubular member having an encircled-portion corresponding to the axial dimension of the wrench-receiving member and compacted against the wrench-receiving member to substantially conform to and bind the outer portion of the encircled-portion to and along the encircling inner periphery of the said wrench-receiving member, rigid union of the members to provide an integrated pipe connector being thereby secured entirely by the respective encircled and encircling portions of the said members.

2. A pipe connector, comprising in combination: a preformed wrench-receiving member constructed of relatively-hard resistant metal; and a tubular fluid-conducting member constructed of relatively-soft yieldable metal rigidly interlocked with the wrench-receiving member against relative movement; the said tubular member having an encircled-portion corresponding to the axial dimension of the wrench-receiving member and compacted against the wrench-receiving member to substantially conform to and bind the outer portion of the encircled-portion to and along the encircling inner periphery of the said wrench-receiving member, rigid union of the members to provide an integrated pipe connector being thereby secured entirely by the respective encircled and encircling portions of the said members.

3. A pipe connector, comprising in combination: a preformed wrench-receiving member constructed of relatively-hard resistant metal and provided with recesses in the inner periphery thereof; and a threaded tubular fluid-conducting member rigidly interlocked with the wrench-receiving member against relative movement; the said tubular member having an encircled-portion corresponding to the axial dimension of the wrench-receiving member and compacted against the wrench-receiving member to substantially conform to and bind the outer portion of the said encircled-portion to and along the encircling inner periphery of the wrench-receiving member and to extrude metal of the said encircled-portion into the recesses in the said inner periphery, rigid union of the members to provide an integrated pipe connector being thereby secured entirely by the respective encircled and encircling portions of the said members.

4. A pipe connector, comprising in combination: a preformed wrench-receiving member of generally-annular form constructed of relatively-non-malleable metal having spaced recesses in its inner periphery; and a tubular body-member constructed of relatively-soft malleable metal rigidly interlocked with the wrench-receiving member against relative movement; the said tubular member having an encircled-portion corresponding to the axial dimension of the wrench-receiving member and compacted against the wrench-receiving member to substantially conform to and bind the outer portion of the said encircled-portion to and along the encircling inner periphery of the wrench-receiving member and to extrude metal of the said encircled-portion into the recesses in the said inner periphery, rigid union of the members to provide an integrated pipe connector being thereby secured entirely by the respective encircled and encircling portions of the said members.

5. The method of producing a pipe connector, comprising: positioning a tubular fluid-conveying member of the pipe connector within a wrench-receiving member of said pipe connector; and then securing rigid interlocking of the said members against relative movement by expanding an encircled-portion of the said tubular member and compacting it against the wrench-receiving member to substantially conform to and bind the outer portion of the said encircled-portion to the encircling inner periphery of the wrench-receiving member.

6. The method of producing a pipe connector comprising: placing a tubular fluid-conducting member constructed of relatively-soft yieldable metal within a preformed wrench-receiving member constructed of hard resistant metal; and then securing rigid interlocking of the said members against relative movement by expanding an encircled-portion of the said tubular member and compacting it against the wrench-receiving member to substantially conform to and bind the outer portion of the said encircled-portion to the encircling inner periphery of the wrench-receiving member.

7. The method of producing a pipe connector, comprising: separately preforming a generally-annular wrench-receiving member constructed of relatively-hard resistant metal and having circularly-spaced series of locking-recesses provided in the inner periphery thereof; arranging a tubular fluid-conducting member constructed of relatively-soft metal within the said wrench-receiving member; and then securing rigid interlocking of the said members against relative movement by cold-working the said tubular fluid-conducting member in position within the wrench-receiving member to expand an encircled-portion thereof and compact it against the wrench-receiving member to substantially conform and bind the outer portion of the said encircled-portion to the encircling inner periphery of the wrench-receiving member and to extrude portions of the metal of the said encircled portion of the tubular fluid-conducting member into the recesses formed in the inner periphery of the said wrench-receiving member.

8. The method of producing a pipe connector, comprising: preforming a wrench-receiving member of relatively-hard resistant metal with a generally-circular inner periphery provided with recesses therein and an outer perimeter of polygonal form; preparing a tubular fluid-conducting member of relatively-softer malleable metal formed with an outside diameter somewhat smaller than that of the inner periphery of the said wrench-receiving member; placing the prepared tubular fluid-conducting member within the said wrench-receiving member in substantially the position it is to occupy in the finished pipe connection; and then securing rigid interlocking of the said members against relative movement by subjecting the said tubular fluid-conducting member to a cold-forging operation to impart predetermined size and shape thereto, the said cold-forging operation compacting an encircled-portion of the tubular member to cause the outer portion thereof to conform to and be bound to the encircling inner periphery of the wrench-receiving member, at the same time, extruding portions of the metal composing said encircled-portion of the tubular fluid conducting member into the recesses formed in the inner periphery of the said wrench-receiving member.

9. The method of producing a pipe connector of the adapter type, comprising: preforming a substantially-annular wrench-receiving member of relatively-hard resistant metal having recesses provided in the inner periphery thereof; preparing a tubular fluid-conducting member of relatively-softer malleable metal having an outer wall somewhat smaller in diameter than the inner periphery of the said wrench-receiving member; positioning the said tubular fluid-conducting member within the said wrench-receiving member with opposite ends of the former extending outwardly from the latter; and then securing rigid interlocking of the said members against relative movement by subjecting the said tubular fluid-conducting member to a cold-forging operation to impart an upwardly-diverging expansion to the lower portion thereof from its lower end to a portion thereof encircled by the said wrench-receiving member, compacting the said encircled-portion against the wrench-receiving member to substantially conform and bind the outer portion thereof to the encircling inner periphery of the wrench-receiving member, and at the same time, extruding portions of the metal composing the said encircled-portion of the fluid-conducting member into interlocking engagement with the recesses provided in the inner periphery of the said wrench-receiving member.

10. A method for producing a pipe connector having a fluid-conducting portion and a wrench-receiving portion, the said method comprising: positioning a tubular fluid-conducting member within a wrench-receiving member; and then subjecting the said tubular fluid-conducting member to a cold-extruding operation by exerting endwise pressure thereon, the said endwise pressure action to cause cold-flow expanding of an encircled portion of the same corresponding to the axial dimension of the wrench-receiving member and compact it to substantially conform and bind the outer portion of the said encircled-portion to and axially along the encircling inner periphery of the wrench-receiving member in non-rotational interlocking engagement with the inner periphery of the said wrench-receiving member.

RICHARD W. SHOEMAKER.